United States Patent [19]

Diehl

[11] 4,291,768
[45] Sep. 29, 1981

[54] PACKING ASSEMBLY FOR WELLHEADS
[75] Inventor: Robert J. Diehl, Wallis, Tex.
[73] Assignee: W-K-M Wellhead Systems, Inc., Shreveport, La.
[21] Appl. No.: 111,760
[22] Filed: Jan. 14, 1980
[51] Int. Cl.³ .......................................... E21B 33/02
[52] U.S. Cl. .................................... 166/315; 166/83; 166/88; 277/73
[58] Field of Search ...................... 166/86, 82, 315, 84, 166/88, 89, 83; 277/103, 73

[56] References Cited
U.S. PATENT DOCUMENTS

| | | | |
|---|---|---|---|
| 572,053 | 11/1896 | Garlock | 277/73 |
| 2,335,355 | 11/1943 | Penick et al. | 166/86 |
| 2,652,895 | 9/1953 | Arrowood | 166/89 |
| 2,684,274 | 7/1954 | Saxon | 277/103 |
| 3,268,243 | 8/1966 | Word, Jr. | 166/89 |
| 3,457,992 | 7/1969 | Brown | 166/88 |
| 3,478,822 | 11/1969 | Hulbert, Jr. et al. | 166/88 |
| 3,976,130 | 8/1976 | Chambless et al. | 166/89 |
| 4,168,936 | 9/1979 | Scheller et al. | 277/103 |

Primary Examiner—James A. Leppink
Attorney, Agent, or Firm—Eugene N. Riddle

[57] ABSTRACT

A packing assembly is mounted in the annular space between a tubing hanger and a tubing head of a wellhead assembly. The packing is bottomed on a shoulder of the tubing hanger and energized after the tubing hanger has been fully seated within the tubing head by the injection of a lubricant or the like against an upper annular piston member which compresses the packing. The piston member is locked to the tubing hanger after the packing has been compressed between the facing annular surfaces of the tubing head and tubing hanger and the entire packing assembly then moves with the tubing hanger.

8 Claims, 5 Drawing Figures

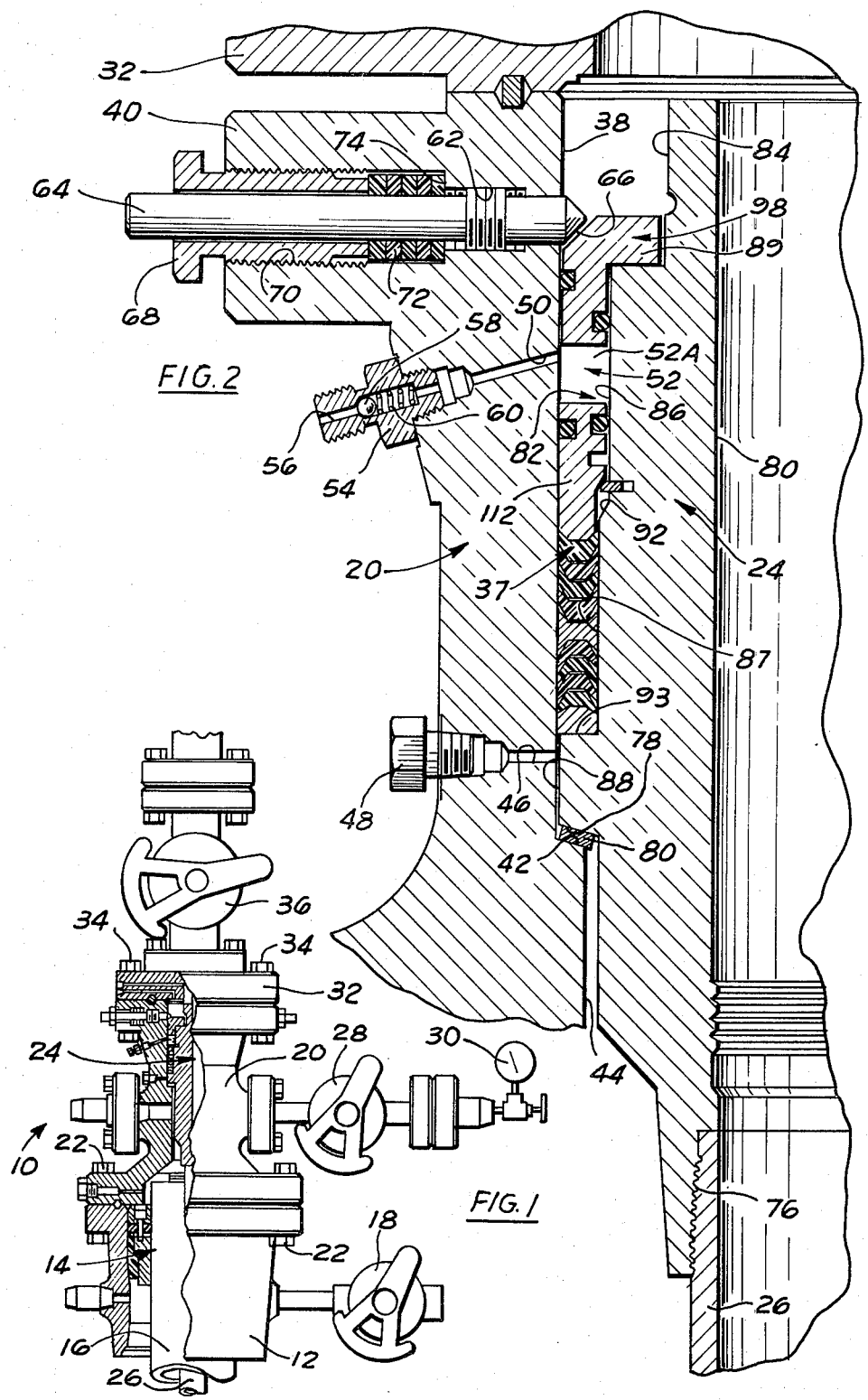

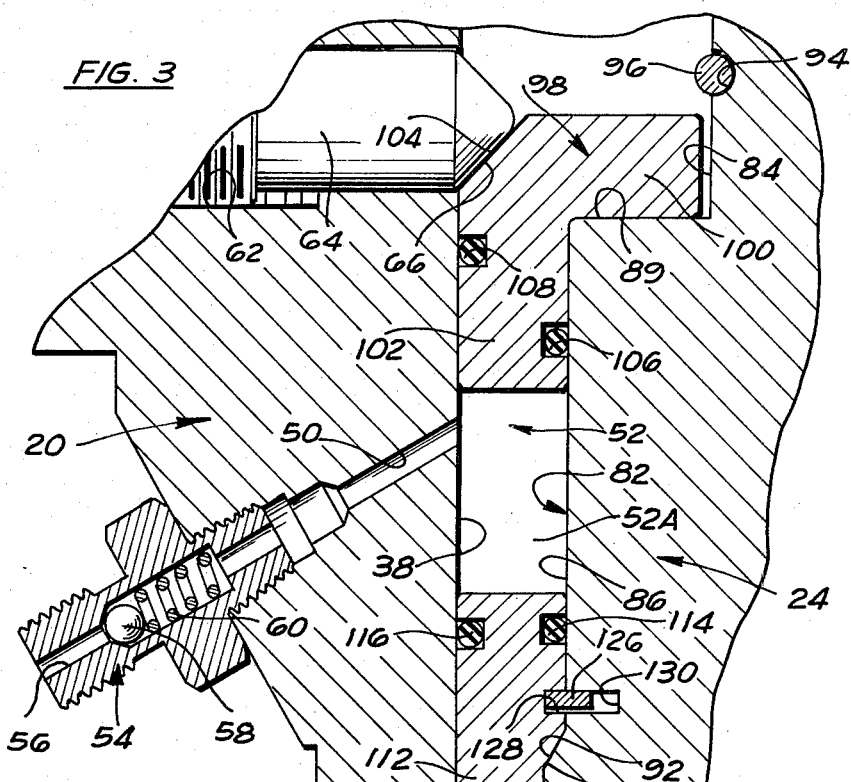

PACKING ASSEMBLY FOR WELLHEADS

BACKGROUND OF THE INVENTION

Heretofore, various types of packing assemblies have been provided in wellheads between an inner tubing hanger and an outer supporting tubing head or bowl on which the tubing hanger is seated or supported. For example, U.S. Pat. No. 3,976,130 dated Aug. 24, 1976 shows a packing for a wellhead assembly which is secured to an inner pipe or casing and is movable with the casing upon expansion thereof resulting from high temperatures. U.S. Pat. No. 3,457,992 dated July 29, 1969, for example, shows a packing compressed between a casing hanger and a tubing head with the compressed packing positioned between a lower supporting ring and an upper shoulder on the casing hanger. However, none of the prior art shows a packing assembly between an inner tubing hanger and an outer supporting head or bowl which includes an upper piston like metal ring which is urged downwardly against packing rings by a suitable lubricant or the like after the inner tubing hanger is fully seated on the supporting head or bowl.

SUMMARY OF THE INVENTION

The present invention is directed to a packing assembly which is compressed between facing annular surfaces of an inner tubing hanger and an outer tubing head with the hanger being fully supported by and seated on the tubing head and held in such seated position by lockdown screws. The packing assembly is energized by a lubricant or the like after the tubing hanger has been fully seated on a metal supporting ring positioned between a supporting shoulder on the tubing head and on opposed shoulder on the tubing hanger with the lockdown screws actuated. The packing assembly includes an upper metallic piston ring which is contacted by the lubricant and moved downwardly to compress lower packing rings between opposed peripheral surfaces of the tubing hanger and the tubing head. The upper metal piston ring is automatically locked into position on the tubing hanger after the piston ring moves downwardly a predetermined amount with the packing rings compressed. Thus, a subsequent expansion of the outer tubing head which might result from fires or the like would not result in a similar movement of the packing assembly as the packing assembly is mounted on and secured to the outer periphery of the tubing hanger.

Thus, an object of the present invention is the provision of a packing assembly for a wellhead positioned in the annulus between a tubing hanger and a tubing head and secured in a compressed relation to the outer periphery of the tubing hanger. The packing assembly is energized after the tubing hanger is fully seated on the tubing head by an injection of lubricant or the like to compress the packing rings a predetermined amount at which position the packing assembly is locked to the tubing hanger.

DETAILED DESCRIPTION OF THE INVENTION

In the accompanying drawings, which form a part of the specification and are to be read in conjunction therewith:

FIG. 1 is an elevational view, partly in section, of a wellhead and christmas tree assembly which incorporates the packing assembly of the present invention;

FIG. 2 is an enlarged section of the packing assembly positioned between a tubing hanger and a tubing head with the holddown screws and tubing hanger being shown prior to engagement of the tubing hanger with the holddown screws;

FIG. 3 is an enlarged section similar to FIG. 2 but showing the holddown screws engaging the tubing hanger with the tubing hanger fully seated on the tubing head;

FIG. 4 is an enlarged cross section of another embodiment of the invention in which a modified split piston ring is illustrated; and FIG. 5 is a fragmentary side elevation of the modification shown in FIG. 4 looking generally along line 5—5 and illustrating means to secure the ends of the piston ring together.

Referring now to the drawings in more detail and particularly to FIG. 1, numeral 10 generally designates a wellhead and christmas tree assembly. The wellhead includes a casing head 12 which is adapted to be secured to the top end of a surface casing (not shown). A slip assembly 14 having suitable seals is mounted within casing head 12 and suspends a well casing 16 which extends downwardly into the well concentrically within the surface casing. Casing head 12 has a valve 18 which is connected with an outlet of the casing head to control the flow from the annular space between the surface casing and well casing 16.

A tubing head 20 is mounted on top of casing head 12 with mating flanges of casing head 12 and tubing head 20 being secured together by bolts 22. A tubing hanger 24 supports a string of tubing 26 which extends concentrically within casing 16 to receive fluids produced by the well. A valve 28 is mounted to a side outlet on tubing head 20 to control the flow of fluid from the annular space between tubing 26 and casing 16. The outlet controlled by valve 28 is equipped with a pressure gauge 30 to provide an indication of the tubing head pressure.

An adapter flange 32 is bolted on top of tubing head 20 by bolts 34. A lower master valve 36 is mounted on top of flange 32 to control the flow from tubing 26. An upper master (not shown) is mounted on top of valve 36 and the remaining portions of a conventional christmas tree, including outlets with suitable wing valves may be provided.

Referring now to FIGS. 2 and 3 in which the present invention is illustrated in enlarged section, FIG. 2 shows the packing assembly comprising the invention indicated generally at 37 before it has activated or energized and FIG. 3 shows packing assembly 37 after it has been activated or compressed. Tubing head 20 has an inner peripheral surface 38 and an upper annular flange 40. A lower inclined annular shoulder 42 connects a lower reduced diameter inner peripheral surface 44 to peripheral surface 38. A test port is provided at 46 and may be utilized for testing the sealing surfaces. A removable plug 48 is utilized to close test port 46 when not in use.

Tubing head 20 has an upper injection port 50 which leads to an annular space or annulus 52 formed between tubing head 20 and tubing hanger 24. A fitting 54 has an opening 56 communicating with port 50 and a back check ball member 58 in opening 56 is urged to a closed position by a spring 60. Flange 40 has an internally threaded opening 62 therein which receives in threaded relation a holddown lock screw 64 having an inner conical tip 66. A packing gland 68 is threaded within an enlarged diameter opening 70 and upon rotation compresses a packing set 72 against shoulder 74 to form a seal between screw 64 and the adjacent surface defining opening 70.

Tubing hanger 24 is internally threaded at its lower end 76 and tubing string 26 is suspended therefrom. A lower inclined shoulder 78 on tubing hanger 24 is positioned adjacent shoulder 42 and a metallic seal ring 80 which may be formed of a metal such as stainless steel or a material having similar properties is positioned between shoulders 42 and 78. Metal ring 80 may be slightly deformed from the weight of tubing string 26 thereby to form a tight metal-to-metal seal between shoulders 42 and 78. Tubing hanger 24 has an inner peripheral surface 80 and an outer peripheral surface indicated at 82. Peripheral surface 82 includes a small diameter portion 84, intermediate diameter portions 86 and 87, and an enlarged diameter portion 88. Horizontal shoulder 89 connects portions 84 and 86, an inclined annular shoulder 92 connects intermediate diameter portions 86 and 87, and a shoulder 93 connects intermediate diameter portion 87 and enlarged diameter portion 88. An annular groove 94 is provided in reduced diameter portion 84 and a suitable snap ring 96 fits therein.

A holddown ring is generally indicated at 98 and includes an inwardly extending horizontal flange 100 in abutting contact to shoulder 89 and a vertical leg 102 fitting within annular space 50. A tapered corner 104 is adapted to engage conical tip 66 of holddown screw 64. Leg 102 has inner and outer O-rings 106 and 108 fitting in suitable grooves in leg 102 to seal between surfaces 38 and 86. The packing assembly generally indicated at 37 includes a ring-like piston member 112 having inner and outer O-rings 114 and 116 fitting in suitable grooves in piston member 112 to seal between surfaces 86 and 38. The packing set of packing assembly 37 includes metal rings 118 and 120 with woven asbestos chevron-type rings at 122 positioned between metal rings 118, 120 and piston 112. Thus, the packing set is fire resistant. To hold piston member 112 in a compressed position of the packing set, a metal retaining snap ring 126 is adapted to fit within an inner groove 128 of piston ring or member 112 and an outer groove 130 in intermediate peripheral portion 86 of tubing hanger 24. Annulus portion 52A of annulus 52 between piston member 112 and holddown ring 98 forms a fluid chamber to receive injected fluids through port 50.

In operation, tubing hanger 24 with tubing string 26 thereon is first seated on shoulder 42 of tubing head 20 with metal ring 80 being slightly defomed by the weight of tubing string 26 to form a tight metal-to-metal seal between hanger 24 and head 20. Next, lock screws 64 are rotated so that the conical tips 66 thereof engage corner 104 to urge holddown ring 98 tightly against tubing hanger 24. Then, to activate packing assembly 37, a suitable injection or lubricant or the like is provided through fitting 54 and port 50 to fill the annular space 52 and urge piston member 112 downwardly to compress rings 122 between rings 118, 120, and piston ring 112. Retaining ring 126 snaps outwardly into engagement with piston member 112 when inclined inner shoulder 113 on piston member 112 engages shoulder 92. In this position, the packing is secured to tubing hanger 24 and will move with tubing hanger 24. Thus any expansion of tubing head 20 will not effect the packing assembly 37 as it will remain locked in position on tubing hanger 24. Further, in the event tubing hanger 24 is removed, the packing assembly 37 will likewise be easily removed with tubing hanger 24 since piston member 112 is secured to tubing hanger 24 and lower ring 120 is bottomed on shoulder 93.

Referring to FIGS. 4 and 5, a separate embodiment of the invention is illustrated in which tubing hanger 24A has a groove 129 formed therein defining upper and lower shoulders 130 and 132 connected by an outer peripheral wall 134. A piston member indicated at 112A fits within groove 129. Inner and outer O-rings 114A and 116A in piston member 112A seal against the adjacent peripheral surfaces. Piston member 112A comprises two halves for initial positioning within groove 129 and a pair of allen head screws 136 secure the halves together. Screws 136 are threaded within openings 138 in one half and bottom on shoulders 139 on the other half.

Tubing hanger 24A has an annular groove 140 therein and a snap ring 142 fits within groove 140 to engage an annular groove 144 in piston member 112A to hold piston member 112A in a compressed position against packing rings 118A and 122A. The steps involved in the activation of packing rings 118A and 122A are similar to that in the embodiment shown in FIGS. 1-3 and when activated by lubricant, piston member 112A will engage in abutting relation shoulder 132 defining groove 129 with snap ring 142 holding piston member 112A in a compressed position of packing rings 118A and 122A and in secured position on tubing hanger 24A.

What is claimed is:
1. In a wellhead assembly, the combination of:
a tubing head having an inner peripheral surface including an inner annular supporting shoulder;
a tubing hanger supported on said supporting shoulder and having an outer peripheral surface spaced from the inner peripheral surface of said tubing head to define an annular space therebetween;
holddown means to seat said tubing hanger tightly on said annular shoulder of said tubing head; and
a packing assembly mounted within said annular space comprising a plurality of lower packing rings, an upper annular piston member mounted over the packing rings for downward movement to compress the packing rings, and cooperating retaining means on said piston member and the outer periphery of said tubing hanger to lock said piston member to said tubing hanger after the piston member moves downwardly a predetermined amount and compresses the packing rings thereby to retain the packing rings in a compressed relation on the tubing hanger.

2. In a wellhead assembly, the combination of:
a tubing head having an inner peripheral surface including an inner annular supporting shoulder;
a tubing hanger supported on said supporting shoulder and having an outer peripheral surface spaced from the inner peripheral surface of said tubing head to define an annular space therebetween;
holddown means to seat said tubing hanger tightly on said annular shoulder of said tubing head including a holddown ring in said annular spacing engaging the tubing hanger and holddown screws engaging the hold-down ring to urge the ring and tubing hanger downwardly to a fully seated position on said shoulder; and a packing assembly mounted within said annular space beneath said holddown ring comprising a plurality of lower packing rings and an upper annular piston member mounted over the packing rings and spaced from the holddown ring to define an annular fluid chamber between the piston member and the holddown ring, a fluid injection port extending through the tubing head to the fluid chamber for injection of a fluid within the fluid chamber to urge the piston member downwardly to compress the packing rings, and cooperating retaining means on said piston member and the outer periphery of said tubing hanger to lock said piston member to said tubing hanger after the piston member moves downwardly a predetermined amount and compresses the packing rings thereby to retain the packing assembly in a compressed relation on the tubing hanger.

3. In a wellhead assembly as set forth in claim 2 wherein said piston member has an O-ring seal on its inner and outer peripheries to seal between the tubing head and the tubing hanger.

4. In a wellhead assembly as set forth in claim 3 wherein said holddown ring has an O-ring seal on its inner and outer peripheries to seal between the tubing head and the tubing hanger.

5. In a wellhead assembly as set forth in claim 2 wherein said tubing hanger has a lower annular shoulder in opposed relation to said supporting shoulder on the tubing hanger, and a metal sealing ring is positioned between said shoulders on the tubing head and tubing hanger to form a tight metal-to-metal sealing relation therebetween.

6. In a wellhead assembly having a tubing hanger seated on an inner shoulder of a tubing head and defining an annular space therebetween; an improved packing assembly mounted in said annular space comprising:
a plurality of lower packing rings, an upper annular piston member mounted over the packing rings for downward movement to compress the packing rings for sealing between the tubing head and tubing hanger, and cooperating retaining means on said piston member and said tubing hanger to lock said piston member to said tubing hanger after the piston member moves downwardly a predetermined amount and compresses the packing rings thereby to secure the packing assembly to the tubing hanger for movement therewith.

7. In a wellhead assembly having an outer tubing head with an inner supporting shoulder therein, a tubing hanger supported on said shoulder and defining an annular space between the tubing hanger and tubing head, and lockdown means to seat said tubing hanger tightly on said shoulder and to seal between the facing surfaces of the tubing hanger and tubing head defining the annular space; an improved packing assembly mounted in said annular space and having a fluid chamber over the packing assembly, said packing assembly comprising:
a plurality of lower packing rings, an upper annular piston member mounted over the packing rings and sealing between the facing surfaces of the tubing hanger and tubing head whereby upon the injection of fluid within the fluid chamber the piston member moves downwardly to compress the packing rings between facing surfaces of the tubing head and tubing hanger, and cooperating retaining means on said piston member and said tubing hanger to lock said piston member to said tubing hanger after the piston member moves downwardly a predetermined amount and compresses the packing rings thereby to secure the packing assembly to the tubing hanger for movement therewith.

8. A method of activating a packing assembly mounted in an annular space between an inner tubing hanger and a supporting outer tubing head of a wellhead asembly, the packing assembly having a plurality of lower packing rings and an upper piston ring member with a fluid chamber over the piston ring member; said method comprising the steps of:
first seating and securing the inner tubing hanger on the outer tubing head in a final seated position;
then injecting a fluid within the fluid chamber over the piston ring member to urge the piston ring member downwardly to compress the packing rings between the adjacent facing surfaces of the tubing hanger and tubing head;
and next locking the piston ring member in the compressed relation of the packing rings to secure the packing assembly to the tubing hanger for movement therewith.

* * * * *